Sept. 30, 1924.                                              1,510,436
                       J. E. ENGLESSON
              HUB FOR IMPELLERS WITH TURNABLE VANES
                Filed March 14, 1923     2 Sheets-Sheet 1
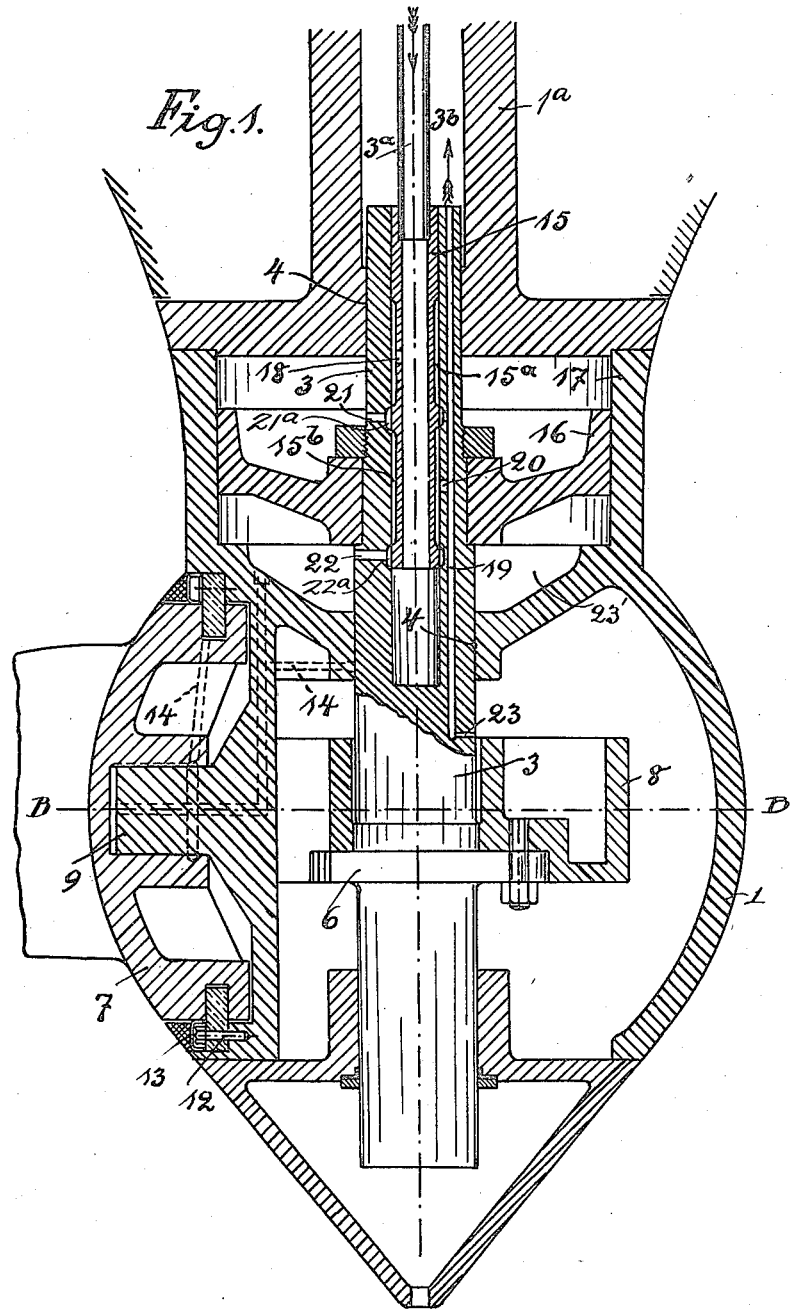
JOHN ELOV ENGLESSON
INVENTOR;

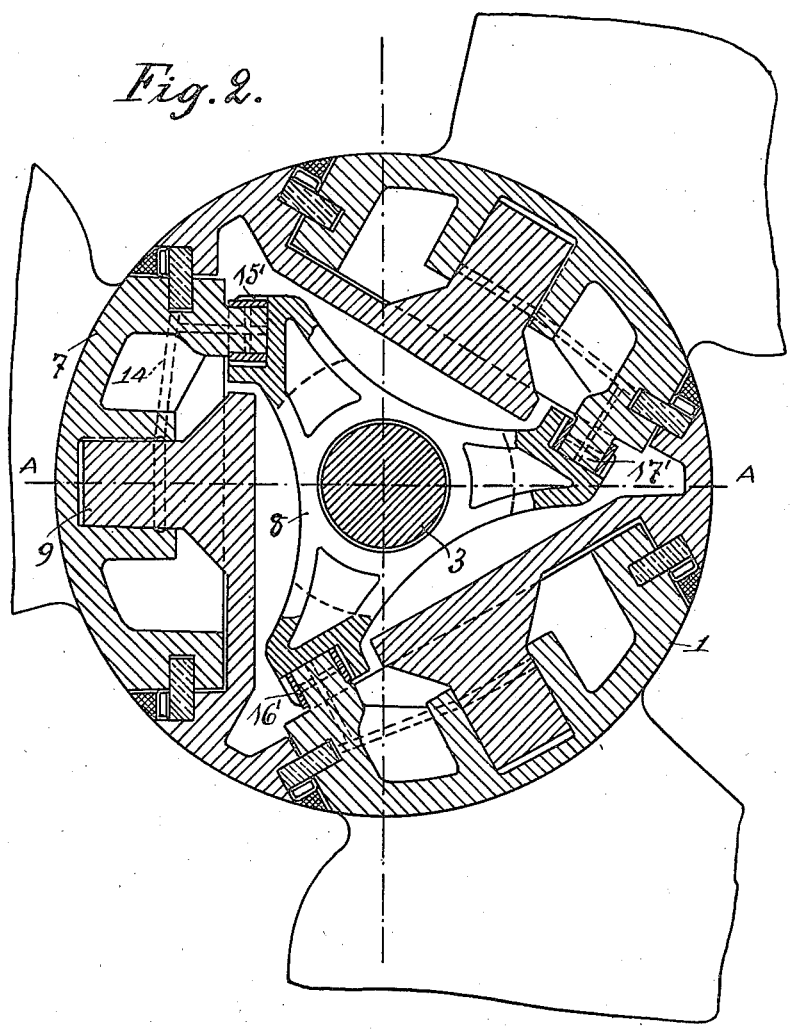

Patented Sept. 30, 1924.

1,510,436

UNITED STATES PATENT OFFICE.

JOHN ELOV ENGLESSON, OF KRISTINEHAMN, SWEDEN.

HUB FOR IMPELLERS WITH TURNABLE VANES.

Application filed March 14, 1923. Serial No. 624,938.

*To all whom it may concern:*

Be it known that I, JOHN ELOV ENGLESSON, engineer, residing at Kristinehamn, Sweden, have invented certain new and useful Improvements in Hubs for Impellers with Turnable Vanes, of which the following is a specification.

My invention relates to improvements in propellers, impellers, and the like, having turnable vanes, and has reference specifically to an improved power transmission for effecting such turning.

Heretofore the transmission of this power from the regulating mechanism in the operating room to the hub of the propeller has been effected by means of a heavy shaft enclosed in a hollow mainshaft. This construction resulted in certain disadvantages which include a weakening of the mainshaft and difficulty in installing and removing the long internal shaft.

I obviate these difficulties by placing the regulating mechanism (in the form of a hollow cylinder and piston) at the propeller hub itself and connecting it or making it integral therewith. A pressure fluid is led to the cylinder by means of a supply pipe inside a hollow mainshaft, and the supply pipe being of a relatively small diameter, the bore in the mainshaft need not be as large in order to carry this supply pipe as to carry the old means of transmission. This supply pipe serves also to act as a connecting rod between the controlling mechanism in the operating room and a distributing valve in the cylinder.

I attain these objects by the mechanism illustrated in the accompanying drawings in which Fig. 1 is an axial sectional view taken on line A—A of Fig. 2; Fig. 2 is a transverse sectional view on the line B—B of Fig. 1.

Referring to the drawings, 1 denotes the body of a propeller- or impeller-hub mounted on a hollow mainshaft $1^a$ inside of which is a supply pipe $3^a$ which allows the passage of fluid under pressure to the interior of a hollow cylinder 17. The latter is provided with a piston 16. The lower end of pipe $3^a$ is fastened to a distributing valve 15 which serves to feed the fluid either above or below piston 16 as desired. This distributing valve 15 is in the shape of a hollow cylinder with annular channels or recesses $15^a$ and $15^b$ in its outer surface and a small passage 18 connecting the annular recess $15^a$ with the inside of the cylinder. The valve 15 is movable axially inside a hollow piston rod 3.

The piston 16 is mounted on this hollow piston rod 3 which is supported by bearings 4 formed by openings in the ends of the cylinder 17. It is the motion of this piston 16 which imparts a shifting motion to vanes 7 supported on journals 9 which are integral with the body of the hub 1. Alternating motion of the piston causes a spider 8 rigidly mounted on rod 3 to rotate each vane about its journal 9 as an axis. This is accomplished through slidable connections between bearings 15' on the spider 8 and pins 17' on the bases of the vanes, as more fully described in my patent application 624938.

There are two annular recesses $21^a$ and $22^a$ on the inside of the piston rod 3 with passages 21 and 22 respectively allowing an opening between each recess and the outside of the rod. The passage 21 opens to the upper surface of the piston 16 and the passage 22 to the lower. A third opening 20 in the piston rod 3 leads to a long longitudinal passage 19, one end of which opens into the bore $3^b$ of the hollow mainshaft $1^a$, while the other end of the passage opens into a passage 23 communicating with the interior of the hub body 1.

In order to effect a motion of piston 16 toward the vanes, for example, (downward in Fig. 1), the distributing valve 15 is moved downward a slight distance so that the annular recess $15^a$ is brought into register with the annular recess $21^a$ leading to passage 21. In this position, passage 22 will lead to annular recess $15^b$. The fluid under pressure supplied through pipe $3^a$ will flow through passage 18, recess $15^a$, recess $21^a$, and passage 21 into the space above piston 16. As the piston 16 is thereby forced downward, any fluid which occupies the space under the piston will be forced through passage 22, recess $22^a$, recess $15^b$, opening 20, and passage 19 to the bore $3^b$ of the hollow shaft $1^a$. Similarly, to effect a motion of piston 16 in the opposite direction (upward, Fig. 1), the distributing valve 15 is moved upward until recess $21^a$ registers with recess $15^b$, thus allowing the fluid above the piston to pass through opening 20 and passage 19 to the bore $3^b$; in such a position, the pressure fluid will flow through passage 22 and exert its upward force on the piston.

For purposes of stability it is advantageous to make the cylinder 17 integral with the body of the hub.

Lubrication of the sliding surfaces of the journals 9 and other parts is effected by leading the oil from the cylinder 17 through passages 14 in the hub body; this of course being possible only when oil is used as the pressure fluid. The passages 14 open into the interior portion 23′ of the cylinder 17.

Due to a leakage of oil into the interior of the hub body 1 (if oil is used) an excessive pressure may build up therein and to provide an outlet for this oil, the passage 23 allows communication from the interior of the hub body through passage 19 to the bore 3ᵇ of the hollow mainshaft 1ᵃ.

What I claim is:

1. In water turbine impellers of the character described the combination with adjustably turnable vanes, a hub for same, a mainshaft, a hollow cylinder connected to the shaft and thus rotating with same, a piston movable in said cylinder and operatively connected with said vanes, fluid means for operating said piston and distributing means for said fluid in said piston.

2. In water turbine impellers of the character described the combination with adjustably turnable vanes, a hub for same, a mainshaft, a hollow cylinder connected to the shaft and thus rotating with same, a piston movable in said cylinder and operatively connected with said vanes, fluid means for operating said piston and distributing means for said fluid, said means containing a regulating valve for said fluid arranged as pilot valve for said piston.

3. In water turbine impellers of the character described the combination with adjustably turnable vanes, a hub for same, a mainshaft, a hollow cylinder connected to the shaft and thus rotating with same, a piston movable in said cylinder, the body of said piston extended axially and operatively connected with said vanes, fluid means for operating said piston and distributing means for said fluid in said piston body.

4. In water turbine impellers of the character described the combination with adjustably turnable vanes, a hub for same, a mainshaft, a hollow cylinder connected to the shaft and thus rotating with same, a piston movable in said cylinder, the body of said piston extended axially and operatively connected with said vanes, fluid means for operating said piston and distributing means for said fluid, said means containing a regulating valve for said fluid, arranged as pilot valve for said piston in said piston body.

5. In water turbine impellers of the character described the combination with adjustably turnable vanes, a hub for same, a hollow mainshaft adapted to allow passage of fluid through it, a hollow cylinder connected to the shaft and thus rotating with same, a piston movable in said cylinder and operatively connected with said vanes, fluid means for operating said piston, distributing means for said fluid, said means containing a regulating valve arranged as a pilot valve for said piston.

6. In water turbine impellers of the character described the combination with adjustably turnable vanes, a hub for same, a hollow main shaft adapted to allow passage of fluid through it, a hollow cylinder connected to the shaft and thus rotating with same, a piston movable in said cylinder and operatively connected with said vanes, fluid means for operating said piston, distributing means for said fluid, said means containing a regulating valve arranged as pilot valve for said piston and a pipe connected with said distributing means and adapted to allow passage of said fluid through it.

7. In water turbine impellers of the character described the combination with adjustably turnable vanes, a hub for same, a hollow mainshaft adapted to allow passage of fluid through it, a hollow cylinder connected to the shaft and thus rotating with same, a piston movable in said cylinder and operatively connected with said vanes, fluid means for operating said piston, distributing means for said fluid, said means containing a regulating valve arranged as pilot valve for said piston and a connecting rod for said valve.

8. In water turbine impellers of the character described the combination with adjustably turnable vanes, a hub for same, a hollow mainshaft, adapted to allow passage of fluid through it, a hollow cylinder connected to the shaft and thus rotating with same, a piston movable in said cylinder and operatively connected with said vanes, fluid means for operating said piston, distributing means for said fluid, said means containing a hollow regulating valve arranged as pilot valve for said piston and a connecting rod for said valve adapted to allow passage of said fluid through it.

9. In water turbine impellers of the character described the combination with adjustably turnable vanes, a hub for same, a hollow mainshaft adapted to allow passage of fluid through it, a hollow cylinder connected to the shaft and thus rotating with same, a piston movable in said cylinder and operatively connected with said vanes, fluid means for operating said piston, distributing means for said fluid, said means containing a hollow regulating valve arranged as pilot valve for said piston and a connecting rod for said valve adapted to allow passage of said fluid through it, said connecting rod passing through said hollow mainshaft.

10. In water turbine impellers of the character described the combination with adjustably turnable vanes, a hub for same, a hollow mainshaft adapted to allow passage of fluid through it, a hollow cylinder connected to the shaft and thus rotating with same, a piston movable in said cylinder and operatively connected with said vanes, fluid means for operating said piston, distributing means for said fluid, said means containing a hollow regulating valve arranged as pilot valve for said piston and a connecting rod for said valve adapted to supply fluid to said hollow regulating valve.

11. In water turbine impellers of the character described the combination with adjustably turnable vanes, a hub for same, a hollow mainshaft adapted to allow passage of fluid through it, a hollow cylinder connected to the shaft and thus rotating with same, a piston movable in said cylinder and operatively connected with said vanes, fluid means for operating said piston, distributing means for said fluid, said means containing a hollow non-rotating regulating valve arranged as pilot valve for said piston and a connecting rod for said valve adapted to allow passage of said fluid through it.

12. In water turbine impellers of the character described the combination with adjustably turnable vanes, a hub for same, a mainshaft, a hollow cylinder connected to the shaft and thus rotating with same, a piston movable in said cylinder and operatively connected with said vanes, fluid means for operating said piston, distributing means for said fluid, said means containing a regulating valve arranged as pilot valve for said piston and a connecting rod for said valve adapted to allow passage of said fluid through it.

13. In water turbine impellers of the character described the combination with adjustably turnable vanes, a hub for same, a mainshaft, a hollow cylinder connected to the shaft and thus rotating with same, a piston movable in said cylinder and operatively connected with said vanes, fluid means for operating said piston, distributing means for said fluid, said means containing a hollow regulating valve arranged as pilot valve for said piston and a connecting rod for said valve adapted to supply fluid to said hollow regulating valve.

14. In water turbine impellers of the character described the combination with adjustably turnable vanes, a hub for same, a mainshaft, a hollow cylinder connected to the shaft and thus rotating with same, a piston movable in said cylinder and operatively connected with said vanes, fluid means for operating said piston, distributing means for said fluid, said means containing a hollow non-rotating regulating valve arranged as pilot valve for said piston and a connecting rod for said valve adapted to supply fluid to said hollow regulating valve.

15. In water turbine impellers of the character described the combination with adjustably turnable vanes, a hub for same, a hollow mainshaft adapted to allow passage of fluid through it, a hollow cylinder connected to the shaft and thus rotating with same, a piston movable in said cylinder and operatively connected with said vanes, fluid means for operating said piston, distributing means for said fluid, said means containing a non-rotating hollow regulating valve arranged as pilot valve for said piston and a connecting rod for said valve adapted to supply fluid to said hollow valve, said connecting rod passing through said hollow mainshaft.

16. In water turbine impellers of the character described the combination with adjustably turnable vanes, a hub for same, a hollow mainshaft adapted to allow passage of fluid through it, a hollow cylinder connected to the shaft and thus rotating with same, a piston movable in said cylinder and operatively connected with said vanes, the body of said piston extended axially, fluid means for operating said piston, distributing means for said fluid in said piston body, said means containing a hollow non-rotating regulating valve arranged as pilot valve in said piston body for said piston and a connecting rod for said valve adapted to supply fluid to said hollow valve, said connecting rod passing through said hollow main-shaft.

17. In water turbine impellers of the character described the combination with adjustably turnable vanes, a hub for same, a mainshaft, a hollow cylinder adjacent said hub and connected with and thus rotating with same, a piston movable in said cylinder and operatively connected with said vanes, fluid means for operating said piston and distributing means for said fluid, said means containing a regulating valve arranged as pilot valve for said piston.

18. In water turbine impellers of the character described the combination with adjustably turnable vanes, a hub for same, a main shaft, a hollow cylinder adjacent said hub and connected with and thus rotating with same, a piston movable in said cylinder and operatively connected with said vanes, the body of said piston extended axially, fluid means for operating said piston and distributing means for said fluid in said piston body, said means containing a regulating valve arranged as pilot valve for said piston.

19. In water turbine impellers of the character described the combination with adjustably turnable vanes, a hub for same, a mainshaft, a hollow cylinder adjacent said hub and connected with and thus rotating with same, a piston movable in said cylinder and operatively connected with said vanes, the body of said piston extended axially, fluid means for operating said piston and distributing means for said fluid in said piston body, said means containing a regulating valve arranged as pilot valve for said piston, a connecting rod for said valve adapted to allow passage of said fluid through it.

20. In water turbine impellers of the character described the combination with adjustably turnable vanes, a hub for same, a hollow mainshaft adapted to allow passage of fluid through it, a hollow cylinder adjacent said hub and connected with and thus rotating with same, a piston movable in said cylinder and operatively connected with said vanes, the body of said piston extended axially, fluid means for operating said piston and distributing means for said fluid in said piston body, said means containing a hollow non-rotating regulating valve arranged as pilot valve for said piston, a connecting rod for said valve adapted to supply fluid to said hollow valve, said connecting rod passing through said hollow mainshaft.

21. In water turbine impellers of the character described the combination with adjustably turnable vanes, a hub for same, a mainshaft, a hollow cylinder adjacent said hub and connected with and thus rotating with same, a piston movable in said cylinder and operatively connected with said vanes, fluid means for operating said piston and distributing means for said fluid, said means containing a regulating valve arranged as pilot valve for said piston, bearings for said vanes integral with said hub, said hub having passages connecting said bearings with the interior of said cylinder to allow passage of lubricating means to said bearings.

22. In water turbine impellers of the character described the combination with adjustably turnable vanes, a hub for same, a hollow mainshaft, a hollow cylinder adjacent said hub and connected with and thus rotating with same, a piston movable in said cylinder and operatively connected with said vanes, fluid means for operating said piston which means comprises a hollow extension of said piston body, said extension projecting into and bearing in said hollow main shaft, said extension having two internal annular recesses and passages connecting said internal recesses with opposite sides of said piston, said piston body having also a longitudinal passage opening into the interior of said mainshaft and an opening connecting said longitudinal passage with the interior of said hollow piston extension, a hollow cylindrical valve movable in said hollow piston body, said valve having two external annular recesses and a passage connecting one of said external recesses with the interior of said valve, a supply pipe in said mainshaft and connected to said valve, said supply pipe being adapted to axially move said valve, so as to bring said internal and external recesses in register, which will allow simultaneous fluid connections between either side of said piston and the interior of said supply pipe and between the other side of said piston and the interior of said mainshaft.

23. In a propeller of the character described, the combination with adjustably turnable vanes of a hollow mainshaft, a hollow cylinder, a piston movable in said cylinder and operatively connected with said vanes, and means for operating said piston by fluid supplied through said mainshaft.

24. A propeller of the character described, as claimed in claim 23, including a hollow piston rod for said piston, said rod projecting into and bearing in said hollow mainshaft, and adapted to allow the passage of said fluid through it.

25. A propeller of the character described, as claimed in claim 23, in which said means comprises a hollow piston rod for said piston, said rod projecting into and bearing in said hollow mainshaft, a hollow cylindrical valve movable in said piston rod, a supply pipe in said mainshaft and connected to said valve, said valve being adapted to cooperate with said piston rod to allow simultaneous fluid connections between either side of said piston and the interior of said supply pipe, and between the other side of said piston and the interior of said mainshaft.

26. A propeller of the character described, as claimed in claim 23, in which said means comprises a hollow piston rod for said piston, said rod projecting into and bearing in said hollow mainshaft, said rod having two internal annular recesses and passages connecting said internal recesses with opposite sides of said piston, said rod having also a longitudinal passage opening into the interior of said mainshaft and an opening connecting said longitudinal passage with the interior of said hollow piston rod, a hollow cylindrical valve movable in said piston rod, said valve having two external annular recesses and a passage connecting one of said external recesses with the interior of said valve, a supply pipe in said mainshaft and connected to said valve, said supply pipe being adapted to axially move said valve so as to bring said internal and external recesses in register which will allow simultaneous fluid connections between either side of said piston and the interior of said supply pipe, and between the other side of said piston and the interior of said mainshaft.

27. A propeller of the character described, as claimed in claim 23, including a hollow hub adjacent said cylinder, bearings for said vanes integral with said hub, said hub having passages connecting said bearings with the interior of said cylinder to allow the passage of lubricating means to said bearings.

28. A propeller of the character described, as claimed in claim 23, including a hollow piston rod for said piston, said rod projecting into and bearing in said hollow mainshaft, a hollow hub adjacent said cylinder, a portion of said hub being a bearing for said piston rod, and said piston rod having a longitudinal passage the opposite ends thereof opening into the interior of said hollow mainshaft and the interior of said hollow hub to provide an outlet for excess lubricating fluid in said hub.

In testimony whereof, I have signed my name to this specification in the presence of two subscribing witnesses.

JOHN ELOV ENGLESSON.

Witnesses:
  ERNST NAIDLINDH,
  HANS PATTERSSON.